Jan. 19, 1937.  S. J. SPURGEON  2,068,620
ELECTRICAL TRANSMISSION SYSTEM
Filed Dec. 16, 1935  2 Sheets-Sheet 1
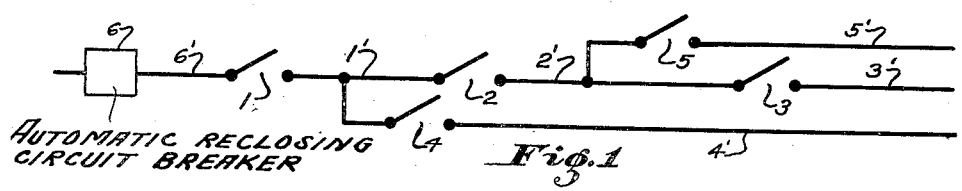
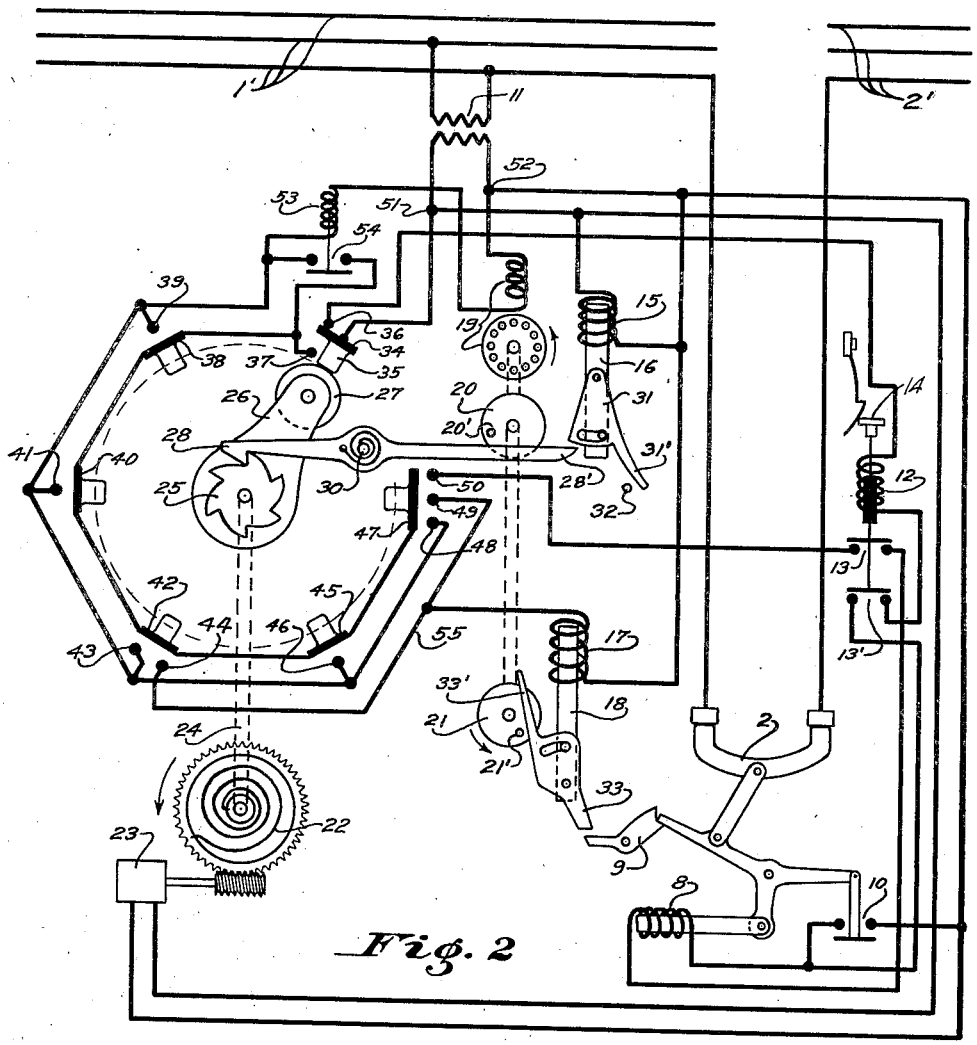
INVENTOR
Samuel J. Spurgeon

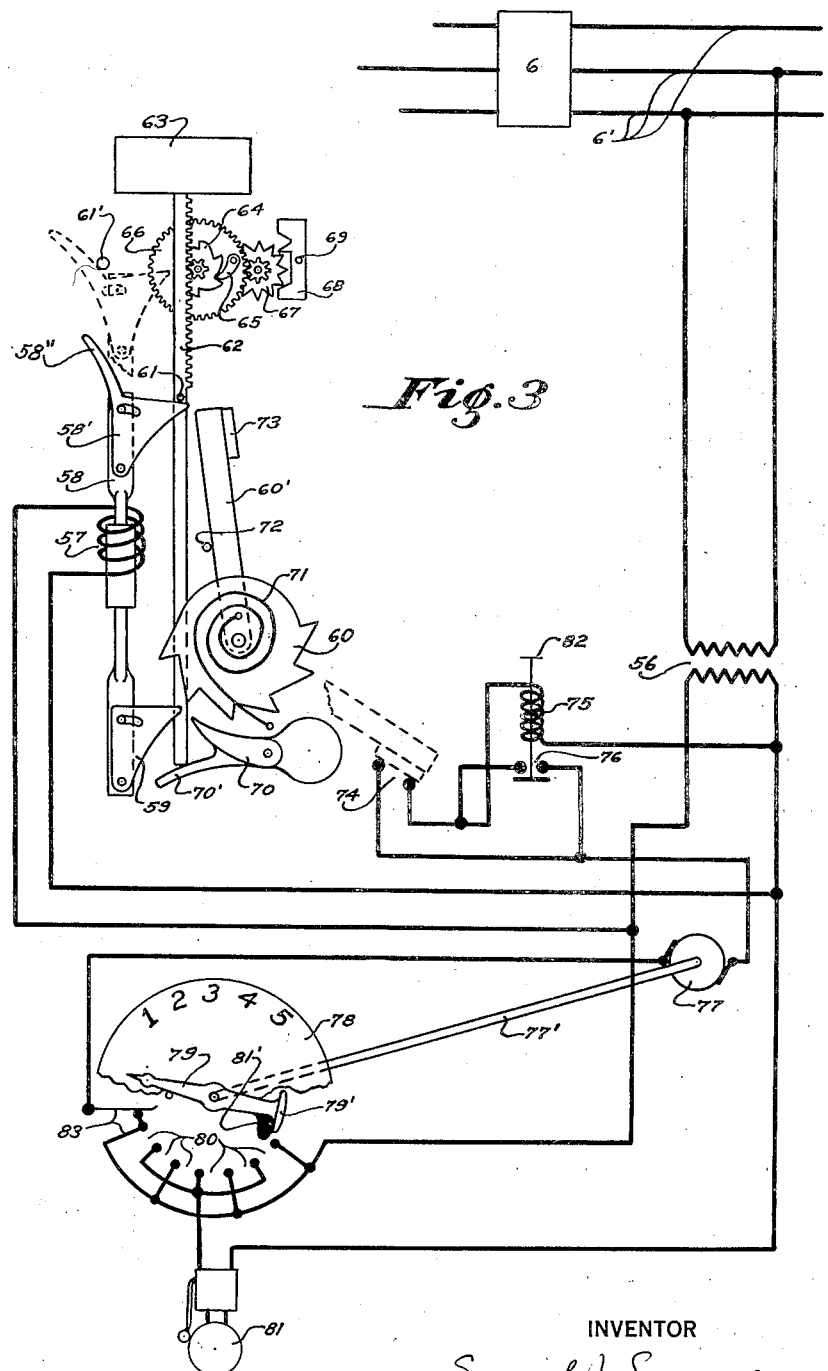

Patented Jan. 19, 1937

2,068,620

UNITED STATES PATENT OFFICE 2,068,620

ELECTRICAL TRANSMISSION SYSTEM

Samuel J. Spurgeon, Birmingham, Ala.

Application December 16, 1935, Serial No. 54,791

15 Claims. (Cl. 175—294)

One of the objects of this invention is to provide a means to operate automatically the sectionizing switches in an electric transmission line so that when trouble on the line occurs it shall be isolated as quickly as possible and service resumed elsewhere without delay.

There are other conditions also in which the invention can be used, but the principles and purposes of the equipment can be most easily explained by assuming a definite set of conditions which are typical of those under which the equipment will operate. The subject matter of this application is the same as that in application Serial No. 679,658, filed July 10, 1933, which was declared abandoned because of failure to prosecute within the specified time.

Referring to the drawings Fig. 1, is a one-line diagram of a transmission line separated into six sections by five line switch stations; Fig. 2 is a diagram of the equipment and electrical circuits at any one of the said line switch stations; and Fig. 3 is a diagram of indicating equipment located near the source of power supply. An oil circuit breaker 6, at the power source supplies power to the three-phase line 6', 1', 2', 3' which is separable into divisions by opening one or more of the 3-hole line switches 1, 2, 3.

These switches may be several miles miles apart and spaced at any desirable locations. The line may also have branches 4' and 5' which are separable from the rest of the line by the switches 4 and 5. Substations, industrial plants, and other consumers of electrical power are connected to the line at various locations. The breaker 6 is assumed to be automatic, and to re-close on 1 minute intervals. When the breaker 6 opens the motor 6a is energized and rotates the cam switches 6b at a speed of 1 R. P. M., thereby energizing the closing coil 6c and so closing 6. When overload occurs in the main circuit the trip coil 6d acts to release the catch 6e and so open 6. In the operation of such a system, trouble at 3' would be cleared by opening the switch 3, and service could then be resumed on all other divisions of the line. Trouble at 4' would be cleared by 4. If trouble occurs at 2' the switch 2 would be opened and service could then be resumed at 6', 1' and 4'. After the trouble at 2' had been corrected by the linemen, they could then re-close the switch 2 and so service would be resumed everywhere. Trouble in other sections of the line would be cared for similarly.

In Fig. 2 is shown a diagram of the control equipment located at switch 2. Similar equipment controls each of the other line switches.

The 3-pole line switch is indicated by 2, and the conductors at each side are marked 1' and 2', of which sections of line they are a part. The switch 2 is closed by the closing coil 8, and held closed by the latch 9. When 2 is open, the pilot switch 10 is closed. The potential transformer 11 supplies A. C. power at a voltage suitable for the various operating coils selector switches relays and other control equipment.

The relay 12, when energized, opens its contacts 13 and 13' and they remain open until reset by the push-button 14. The coil 15 acts to lift the plunger 16; and the coil 17 lifts the plunger 18. When de-energized the coils allow these plungers to drop by gravity. A small geared motor 19 drives its long shaft, and the two discs 20, 21, at a speed of 2 R. P. M. A spring 22, continuously wound by the motor 23 tends to drive its shaft 24, also the notched-wheel 25 and its attached arm 26 in the end of which is mounted the roller 27, at a speed of ⅓ R. P. M., this speed being maintained by a suitable governor. A latch 28 engages with 25 and normally holds it from turning. The disc 20 carries a pin 20' which acts to press down 28', the other end of 28, thereby disengaging 28 from 25, as 20 is revolved. A spring around the pivot 30 biases 28 to the position shown. When the plunger 16 drops, the swing arm 31 engages with 28' and disengages 28 from 25. Further descent of 16 causes the extension 31' to engage with the pin 32, thereby disengaging 31 from 28', which then returns to normal.

When the plunger 18 drops the swing arm 33 engages with the extension on 9 and turns 9, thereby allowing the switch 2 to open. But when the disc 21 is at a certain part of its rotation, the pin 21' engages with the extension 33', turning 33 so that it can descend without engaging 9.

The members 25, 26, 27 and 28 are shown in normal positions. The roller 27 rests against the insulation block 35 and so lifts the contact 34 out of contact with 37 and into contact with 36. When 25 is allowed to revolve, one notch at a time, it similarly closes, successively, the contacts 38—39, 40—41, 47—48, 49, 50.

Under normal conditions power would be on the line and all switches, 1, 2, 3, 4 and 5 would be closed. Assume that a temporary short circuit occurs in section 2'. The breaker 6 will open, clear the trouble since it was only temporary, and then reclose in one minute. Power therefore stays on the line and it is not desirable to open any of the line switches.

The devices act as follows:

Coil 15 is de-energized when the breaker 6 opens; 16 drops, 31 engages 28' thereby dis-engaging 28 from 25; 22 revolves 26 counterclockwise at a speed which causes 27 to close 38—39 in 30 seconds from the instant power went off the line.

When 27 moves away from 35, 34 drops down to its normal position and contacts with 37. Since 34—37 are closed, the circuit is completed from 51, 34, 37, 38, 39, the series coil 53, the motor 19 and so back to 52. Therefore when power again comes back on the line, the coil 53 closes the contacts 54, and so 19 will run until power again goes off the line or until the successive lifting of 28 allows the revolution of 26 to be completed, and 27 again lifts 34 away from 37. This is normal position again.

Now if the trouble at 2' is permanent instead of temporary, the breaker 6 will reclose in one minute from the time it opened, but will reopen promptly. Meanwhile the contacts 38—39 have been closed as previously and the coil 15 is now momentarily energized and de-energized again by the closing and opening of 6, and so 31 is raised and dropped. This again lifts 28 away from 25, which then revolves one more notch, and 27 closes 40—41. When the breaker 6 again re-closes, only to open again, another impulse releases 28 from 25 again, allowing 26 to turn until 27 closes 42, 43, 44.

When the breaker 6 makes its third reclosing, the momentary impulse releases 28 from the next notch in 25 and it also gives a momentary impulse from the contact 44 through 55 to the coil 17 and so back to 52. This lifts 18 and when the breaker 6 again opens on account of the short-circuit at 2' the plunger 18 is dropped; 33 strikes 9 and releases it so that the line switch 2 opens. The momentary impulse which 15 receives again releases another notch on 25, so that 26 will move around and 27 will close 45—46.

When 6 next re-closes, the line switch 2 is open and therefore power stays on the line. The coil 53 is energized through the circuit 51, 34—37, 45—46, the coil 53, the motor 19, and so to 52. This closes 54 and 19 continues to run.

The pin 28' revolves, presses down 28' and releases another notch on 25 which then revolves until 27 presses 47 outwardly thereby closing 47—48, 49, 50. If desired, the pair of contacts 45—46 can be omitted, but I prefer the arrangement shown which allows the line to be energized for a short interval before 2 is reclosed. Current from 49 energizes 17 and so raises 18; the coil 15 also raises 16 as previously. At the same time current from 50 passes through 13, the coil 8, 10, and so to 52. Thereupon 8 acts to close 2 which is latched closed by 9. Closing 2 now puts the short-circuit back on the line and the breaker 6 again opens, thereby releasing 16 and 18, so that another notch in 25 is released; also 33 engages 9 and so opens 2 again.

It is now desired to lock open the switch 2, since the trouble is shown to be in the adjacent section 2'. The arm 26 travels from 47 to 35, completing its cycle, and 34 is raised away from 37 and into contact with 36. Since 2 is open 10 is closed and the circuit is closed from 51, through 34—36, the coil 12, 13', 10 and back to 52. Thereupon the coil 12 opens both 13 and 13', which remain open until reset manually by the push button 14 being released from the latch shown in Fig. 2. The gap at 13 prevents the closing coil from being energized, and the gap 13' de-energizes the coil 12.

When men have cleared the trouble at 2', the device is reset by means of the push-button 14, 2 is closed manually and this re-establishes normal conditions.

Now if the trouble had been at 3' instead of at 2', with the switch 3 open the power would have remained on the line after the line switch 2 had been closed by the closing of the contacts 47—50. The revolution of 20' would then have released 25 so that 26 would revolve to normal position. The coil 17 would meanwhile hold 18 up until the revolution of 21' pushes in 33' so that 33 will clear 9 as 18 drops when contacts 47 and 49 are separated by the removal of 27. Therefore 2 remains closed and 10 stays open, so that when 27 reaches 35, and closes the contacts 34—36, the coil 12 does not become energized as 10 is now open. Therefore normal conditions again prevail with the switch 2.

It is evident therefore, that with automatic equipment, as indicated by Fig. 2, installed at 1, 2, 3, 4 and 5 the action will be as desired. After three unsuccessful reclosures of the breaker 6 every one of the line switches will open automatically. Then when power comes back on 6', the equipment at 1 illustrated in Fig. 2, will begin to operate and in the predetermined time will close 1. If this does not cause the immediate reopening of 6 then the control equipment at 1 resets to normal, with power on 1'. In like manner 2 closes after an interval and puts power on 2'. Then 3 in turn will close and put power on 3'. But whenever a switch closes which is immediately adjacent to line trouble then that switch immediately re-opens and locks open, leaving all other switches between the trouble and the power source closed and in normal condition.

On branch lines such as 4' and 5' a modification is made. It is assumed that these branch lines are not so important as the main line from 6 to 3'. The equipment at 4 and 5 is modified by so changing the motors 19 and 23 and the governor for 25, that 25 revolves more slowly than at the other line switch stations. The spacing between 34 and 38, 38 and 40, and 40 and 42 and the space between 45 and 47 are proportionately reduced so that there is the same time interval required at each line switch station for the arm 26 to travel over these spaces. The space between 42 and 45 is increased sufficiently to give time for all of the main line switches to complete their cycles of operation before the branch line switches 4 and 5 reclose. And the less important of the branch line switches is delayed more than the other one, so that they also close consecutively. In this way all line switches open simultaneously in case of permanent trouble, but the closings of 4 and 5 are delayed until after 3 has closed.

Or the same result can be secured at 4 and 5 by having more notches in 25 and interposing two or more sets of contacts in place of the one set 45—46. This also would give time for 2 and 3 to carry out their schedule of operation before 4 or 5 recloses.

Then if permanent trouble occurs on 4' or 5' the switch 4 or 5 will be the one to open and lockout thereby clearing the rest of the line so that service can be resumed.

It is obvious that the control of the line switches is dependent upon the opening and closing of the circuit breaker 6 at the source of power, and the consequent energizing and deenergizing of the line. Therefore, by opening and closing this circuit breaker manually on the proper timing schedule, conditions can be imposed upon the line which will cause all the line switches to open simultaneously.

Then when the line is re-energized the line switches will automatically reclose on a known schedule.

Now if the line is de-energized immediately after one of the line switches has automatically reclosed, then that line switch will re-open and lock itself open, as described above.

Since the time schedule of the line switches is known, the operating man can by this method cause any desired one of the line switches to be opened and locked open, while all other switches between that one and the source of power are left closed and in normal condition.

There are many other modifications which can be made without departing from the principles of my invention. It is easy to employ series transformers to indicate when an excess overload or short-circuit exists on the system, and thereby open the line switches.

Thus the switch 2 could be tripped open by an overload trip coil of the usual type, instead of by the de-energizing of the potential coil 17, which drops 33 and so trips 9 loose. Or a combination of potential and overload coils can be made to accomplish the desired result. Also two or three potential coils can be used instead of one, thus getting the advantages of control from any one of the three phases instead of only one phase. In each case the control circuit would still embody my principles.

Also a single main circuit breaker can be used to supply several branch lines each of which is separable from the main circuit breaker by a sectionalizing switch of its own. And these sectionalizing switches can all be located relatively close to the main breaker. In such an arrangement, the control relays would be arranged to operate successively, just as 3, 4, and 5 do. Therefore such a system will similarly act so that the portion of line which is in trouble will be automatically disconnected while service is resumed elsewhere on the remaining branch lines. In all such modifications the fundamental principles of my invention are retained; namely, to open all sectionalizing switches in case of persistent trouble on the circuit, then to reclose the sectionalizing switches successively until the section is reached where the trouble is, then to close and re-open and lock open the switch nearest to the trouble, and, finally, to accomplish these results by automatic equipment which is controlled only by the voltage and current-flow conditions in the main circuit itself, without the use of any pilot circuit, superimposed frequencies, or other circuits or currents other than from the main power supply.

Fig. 3 shows in diagram the auxiliary equipment at the main supply circuit breaker, which indicates which line switch has been locked open due to permanent trouble on the line. The potential transformer 56 is connected to the line side of circuit breaker 6, and through it the coil 57 is always energized if 6', the first section of the line, is energized.

The plunger 58 of the solenoid 57 has a catch 59 which engages with the notch-wheel 60 and turns it one notch whenever the coil 57 is energized after having been de-energized.

When 58 is raised by the coil 57, the movable arm 58' also engages the pin 61 and thereby lifts the toothed rack 62 and weight 63. As the rack 62 is raised it turns the ratchet wheel 64 by means of its pinion. At the top of its travel the arm 58'' engages with the pin 61', and is moved thereby so that 58' is dis-engaged from the pin 61, leaving 62 free to descend. The pawl 65 engages with 64 only as the rack 62 is descending, and when this occurs the gear 66 and the escapement wheel 67 are also revolved by the descending weight. The escapement wheel 67 is delayed by the rocking weight 68 which rocks about the pivot 69 and acts to retard the descent of the rod 62.

When 62 has descended fully, its lower end engages with the offset arm 70', moving 70 out of engagement with 60 and thereby allowing 60 to be turned back by the coil spring 71 until the arm 60', which is secured to 60, comes against the stop 72. The arm 60' also carries a contactor 73 which acts to close the circuit at 74 when 60' reaches the end of its travel in a clockwise direction. Closing contacts 74 when 56 is energized will energize the coil 75 which then closes the contacts 76, thereby starting the motor 77. This motor will continue to run until 56 is de-energized, and in so doing the motor turns the slow-speed shaft 77' to which it is geared. Held on the shaft 77' by a slip friction joint is the hand 79 which revolves before the numbered face 78. The hand is shown in its zero position. As the hand 79 travels away from zero, contact 79' at its other end closes successively the series of contacts 80, 80, 80, thereby energizing periodically the alarm 81 which gives notice to the attendant.

Operation is as follows:

Under normal condition 56 is energized, the notch-wheel 60 is at its zero position, 57 is energized and 63 is at its bottom position.

If permanent trouble on the line occurs, the breaker 6 will open and reclose automatically on a predetermined schedule which can be assumed to be one reclosure every minute until lockout occurs. This is usual practice, and is familiar to all who know the art.

As the breaker 6 is opened and then closed again, the coil 57 is de-energized and energized again. Therefore the plunger 58 and its ratchet member 59 are dropped and raised at each opening and reclosure of 6. So the member 59 on each up-stroke notches the wheel 60 ahead one notch. This occurs in coordination with the advancing of the arm 26 at each of the line switch stations. The number of notches in 60 is such that when the contacts 42—43, 44 at each line switch station are closed, the contacts 74 are closed at the breaker 6. Closing the contacts 74 momentarily, starts the motor 77 as explained above. Therefore the motor 77 starts to revolve just as all the line switches are automatically opened. As explained above, one minute after the line switches have all been opened, the breaker 6 is reclosed, energizing the first section of the line up to line switch 1, which is open. One minute after 6 has been reclosed line switch 2 is automatically reclosed. If there is no trouble on the next section of the line 2', then 2 stays closed. But if there is trouble on the line next to 2, then the breaker 6 is automatically tripped open and this causes the line switch 2 to open and lock open.

Meanwhile, the hand 79 has been slowly revolving. The parts are so proportioned that when the time is reached for the line switch 1 to be reclosed, the hand 79 points to 1 on the face plate 78. If the trouble is in the section of line next adjacent to 1, the breaker will open at once de-energizing the line and allowing the solenoid 75 to drop its plunger and open the contacts 76. This stops the hand 79 which tells the operator that switch 1 is the one which has opened and locked open. Similarly if the line trouble is in section 2′ the hand 79 is pointed at 2 when the switch 2 is reclosed. And if power then goes off the line the switch 2 opens and locks open. Again the hand 79 is stopped and remains pointing at the figure which indicates which line switch has locked open.

If the line trouble has meanwhile been eliminated, then each of the line switches will successively close until service is resumed everywhere. Also the hand 79 will continue to advance until the knob 81′ acts to open the contacts 83, at the same time keeping the alarm 81 energized so that the operator will come and reset the device. This is done by pressing down on the button 82 and so opening the contacts 76 so that the motor 77 ceases to run. The operator also turns back the hand 79 on its friction joint so that it again points to the zero position.

It has long been customary to employ in substations or transmission lines, switches which open excessive overload, reclose automatically one or more times, and re-open and lock open if the trouble on the line proves to be permanent.

Such equipment always responds to excessive overloads, in the circuit whether power has previously been continuously on the line or not. With my system, no switch opens if power has been flowing through the switch normally for the period just preceding the excessive overload, or the loss of voltage on the line. This difference helps to make my system selective. For, in the first part of the cycle, no line switch opens unless power has previously been off the line, as when a short-circuit has occurred severe enough to cause the main supply circuit breaker to be open for a substantial interval of time. Then, if this oil breaker is closed and immediately trips open again, it is an indication of serious line trouble. Under such conditions all of my line switches open as soon as the main breaker has again opened and thereby de-energized the line.

Also if desired several closely successive reclosings of the breaker 1 can be required before any of the line switches open.

In the second part of the cycle of operation of my system, when the main circuit breaker has been closed the line switches reclose automatically after successive intervals. Now if power goes off just after a line switch has been closed, it indicates that the next adjacent section of line is still in trouble and is the cause of the overload which tripped open the main breaker. Therefore this last line switch opens and locks open. But if power remains on the line for a substantial time after a line switch has been reclosed it indicates that the next adjacent section of line is normal. Under these conditions this line switch will remain closed and it will later carry an overload excessive enough to open the main breaker again, and this line switch will not open though a succeeding line switch which has just been reclosed will open and lock open on the same overload.

These factors make my system automatically selective in opening and locking open the desired line switch while keeping all other line switches closed, despite the excessive overload which they carry.

I claim:

1. In an electrical transmission system, in combination, a line supplied with power current, a circuit breaker for the line operable to open automatically responsive to fault conditions on the line and to reclose on a predetermined time schedule, a multiplicity of line switches subdividing the line, automatic means to open the said line switches simultaneously, but only when a predetermined number of successive energizations and de-energizations have occurred in the main line, and automatic means then operable to reclose the line switches successively, together with automatic means to re-open and lock in open position, selectively, a single one of the said line switches, all of the said automatic means being coordinated only by the opening and reclosing of the breaker and of the line switches and the resultant changes in the conditions of power current in the said line.

2. In an electrical transmission system, in combination, a circuit breaker, a main line supplied with power current through the said breaker, means to open and reclose the breaker in a predetermined series of operations whenever fault conditions are present on the said main line, a line switch remote from the breaker and operable by automatic means to open the main line only after a predetermined number and sequence of operations of the breaker has occurred, then to reclose the line switch and then to re-open it and lock it open in case the fault conditions are still present, the said automatic means being coordinated only by the said opening and reclosing of the said breaker and the subsequent changes in the conditions of power current in the said main line.

3. In an electrical transmission system, a circuit breaker, a main line supplied with power current through the said breaker, automatic means to open and to reclose the breaker on a pre-determined time schedule of successive operations whenever overload conditions are present on the said main line, line switches remote from the breaker and operable by automatic timing devices to open their respective switches upon a time schedule responsive to a predetermined number and sequence of opening and closing operations of the circuit breaker and to reclose said line switches on a time schedule coordinated with the schedule of opening and closing operations of the said breaker, and thereby to subdivide the main line into a series of sections, together with means adjacent to each line switch to initiate the operation of the said timing devices upon de-energization of the main line.

4. In an electric transmission system, in combination, a circuit breaker, a main line supplied with power current through the said breaker, means to open and to reclose the breaker successively and thereby de-energize or re-energize the line at each operation, a multiplicity of line switches subdividing the line, automatic means to open the line switches simultaneously whenever a predetermined number and sequence of opening and closing operations of the breaker has occurred, automatic means then operable to reclose the line switches successively, automatic means to re-open and lock open any one of said switches if the main line is de-energized within a pre-determined time after the reclosure of said switch, together with automatic means to prevent such re-opening if the main line remains energized for a predetermined time after the said reclosure of such switches, the said automatic means being coordinated only by the operations of the circuit breaker and the line switches and the subsequent changes in the conditions of power current in the main line.

5. In combination, an electric power circuit comprising a plurality of sections and a sectionalizing switch connecting two said sections in series, a source of current, a circuit breaker connecting said source to one of the said sections, said circuit breaker being operable upon occurrence of fault conditions in one of said sections to open and reclose in a predetermined series of opening and closing operations thereby deenergizing or energizing the circuit at each operation, automatic means operable to open the sectionalizing switch only after a predetermined number and sequence of opening and closing operations of the breaker has occurred, operable then to reclose the switch, and then to re-open it if the breaker opens within a predetermined time after the said reclosure of the switch, the said automatic means being coordinated only by the said operations of the circuit breaker and the subsequent changes in the conditions of power current in the main line.

6. In combination, an electric power circuit comprising a plurality of sections and sectionalizing switches connecting said sections in series, a source of current, an overload circuit breaker between said source and said circuit, said circuit breaker being operable to open and reclose successively on a predetermined time schedule under sustained overload conditions, and electromagnetic means interposed between each sectionalizing switch and the circuit breaker, said electromagnetic means being energized from the power circuit and operable responsive to a predetermined number and sequence of operations of the circuit breaker to effect the opening of the sectionalizing switches.

7. In combination, an electric power circuit comprising a plurality of sections and sectionalizing switches connecting said sections in series, a source of current, an overload circuit breaker between said source and said circuit, said circuit breaker being operable to open and reclose successively on a predetermined time schedule under sustained overload conditions, electromagnetic means interposed between each sectionalizing switch and the circuit breaker, said electromagnetic means being energized from the power circuit and operable responsive to a predetermined number and sequence of operations of the circuit breaker to effect the opening of the sectionalizing switches, and means included in the electromagnetic means operable responsive to a reclosing of the circuit breaker following the opening of the sectionalizing switches to close the sectionalizing switches in sequence, beginning at the one nearest the circuit breaker.

8. In combination, an electric power circuit comprising a plurality of sections and sectionalizing switches connecting said sections in series, a source of current, an overload circuit breaker between said source and said circuit, said circuit breaker being operable to open and reclose successively on a predetermined time schedule under sustained overload conditions, electromagnetic means interposed between each sectionalizing switch and the circuit breaker, said electromagnetic means being energized from the power circuit and operable responsive to a predetermined number and sequence of operations of the circuit breaker to effect the opening of the sectionalizing switches, means included in the electromagnetic means operable responsive to a reclosing of the circuit breaker following the opening of the sectionalizing switches to close the sectionalizing switches in sequence, beginning at the one nearest the circuit breaker, and other means for again opening and locking out the sectionalizing switch next preceding that section which produces overload conditions.

9. In a power transmission system, a power circuit, an overload circuit breaker operable to deenergize and energize the power circuit at predetermined time intervals upon sustained overload conditions, a sectionalizing switch dividing the power circuit into sections, and automatic means operated by current from the power circuit for controlling the sectionalizing switch and operable responsive to a predetermined number and sequence of energizations and deenergizations of the power circuit, to open the sectionalizing switch.

10. In a power transmission system, a power circuit, an overload circuit breaker operable to deenergize and energize the power circuit at predetermined time intervals upon sustained overload conditions, a sectionalizing switch dividing the power circuit into sections, and automatic means operated by current from the power circuit for controlling the sectionalizing switch and operable responsive to a predetermined number and sequence of energizations and deenergizations of the power circuit, to open the sectionalizing switch and to reclose it upon a succeeding reenergization of the power circuit.

11. In a power transmission system, a power circuit, an overload circuit breaker operable to deenergize and energize the power circuit at predetermined time intervals upon sustained overload conditions, a sectionalizing switch dividing the power circuit into sections, and automatic means operated by current from the power circuit for controlling the sectionalizing switch and operable responsive to a predetermined number and sequence of energizations and deenergizations of the power circuit, to open the sectionalizing switch and to reclose it upon a succeeding reenergization of the power circuit, and to again open and lock out the sectionalizing switch if overload conditions continue to prevail on that portion of the power circuit controlled by the sectionalizing switch.

12. In an electrical distribution system embodying a power circuit, a main automatic circuit breaker operative responsive to overload conditions in the system to open and close the power circuit at predetermined time intervals so long as overload conditions prevail and to remain closed when overload conditions no longer prevail, sectionalizing switches dividing the system into sections, and automatic means associated with each sectionalizing switch for opening the same upon repeated opening and closing of the main circuit breaker, comprising a device operative upon each breaking of the power circuit, a second device operative upon restoration of the power circuit, and a third device operative responsive to a predetermined number of operations of the first and second devices to open the sectionalizing switch.

13. In an electrical distribution system embodying a power circuit, a main automatic circuit breaker operative responsive to overload conditions in the system to open and close the power circuit at predetermined time intervals so long as overload conditions prevail and to remain closed when overload conditions no longer prevail, sectionalizing switches dividing the system into sections, electromagnetic means energized from the power circuit and associated with each sectionalizing switch, said electromagnetic means being operable responsive to opening of the power circuit, other electromagnetic means operable responsive to a reclosing of the power circuit, and means responsive to a predetermined number of sequence of operations of both the said electromagnetic means for opening the sectionalizing switch.

14. In an electrical transmission system, in combination, a circuit breaker, a main line supplied with power current through the said breaker means to open and reclose the breaker in a predetermined series of operations whenever fault conditions are present on the said main line, a line switch remote from the breaker and operable by automatic means to open the main line only after a predetermined number and sequence of operations of the breaker has occurred, then to reclose the line switch, the said automatic means being coordinated only by the said opening and reclosing of the said breaker and the subsequent changes in the conditions of power current in the said main line.

15. In an electrical transmission system, a circuit breaker, a main line supplied with power current through the said breaker, automatic means to open and to reclose the breaker on a pre-determined time schedule of successive operations whenever overload conditions are present on the said main line, a line switch remote from the breaker and operable by an automatic timing device to be opened upon a time schedule coordinated with the schedule of the opening and closing operations of the said breaker, and thereby to divide the said main line into sections, together with means adjacent to the line switch to initiate the operation of the said timing device upon de-energization of the main line.

SAMUEL J. SPURGEON.